(12) United States Patent
Zisimopoulos et al.

(10) Patent No.: US 9,888,375 B2
(45) Date of Patent: Feb. 6, 2018

(54) NETWORK ENTITY, A WIRELESS COMMUNICATION UNIT AND METHODS FOR ACCESS TO A REMOTE PRIVATE IP NETWORK AND SUPPORTING THEREOF

(75) Inventors: Haris Zisimopoulos, London (GB); Huarui Liang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 159 days.

(21) Appl. No.: 13/391,588

(22) PCT Filed: Aug. 18, 2010

(86) PCT No.: PCT/KR2010/005439
§ 371 (c)(1),
(2), (4) Date: Feb. 21, 2012

(87) PCT Pub. No.: WO2011/021840
PCT Pub. Date: Feb. 24, 2011

(65) Prior Publication Data
US 2012/0147834 A1 Jun. 14, 2012

(30) Foreign Application Priority Data

Aug. 21, 2009 (GB) .................................. 0914616.8

(51) Int. Cl.
*H04W 72/04* (2009.01)
*H04W 8/12* (2009.01)
*H04L 29/12* (2006.01)
*H04L 29/06* (2006.01)
*H04W 8/26* (2009.01)
(Continued)

(52) U.S. Cl.
CPC .......... *H04W 8/12* (2013.01); *H04L 29/12066* (2013.01); *H04L 29/12735* (2013.01); *H04L 61/1511* (2013.01); *H04L 61/3075* (2013.01); *H04L 29/12226* (2013.01); *H04L 29/12245* (2013.01); *H04L 61/203* (2013.01); *H04L 61/2015* (2013.01); *H04L 63/164* (2013.01);
(Continued)

(58) Field of Classification Search
CPC ........... H04L 12/66; H04L 12/28; H04W 4/16
See application file for complete search history.

(56) References Cited

U.S. PATENT DOCUMENTS

2002/0069283 A1 6/2002 Lee
2003/0112793 A1* 6/2003 Sengodan ........... H04L 12/2856
370/352
(Continued)

FOREIGN PATENT DOCUMENTS

KR 10-2001-0008284 A 2/2001
KR 10-2005-0099943 A 10/2005
(Continued)

*Primary Examiner* — Anez Ebrahim
(74) *Attorney, Agent, or Firm* — Jefferson IP Law, LLP

(57) ABSTRACT

A method for supporting access to a remote private internet protocol (IP) network, comprises, at a network entity, receiving an access request message from a wireless communication unit, wherein the access request message comprises an identifier. The method further comprises determining from the identifier that the access request message indicates a remote access request to the remote private IP network of the wireless communication unit; and sending an access acceptance message to the wireless communication unit.

17 Claims, 10 Drawing Sheets

(51) Int. Cl.
*H04W 48/20* (2009.01)
*H04W 84/04* (2009.01)

(52) U.S. Cl.
CPC .............. *H04W 8/26* (2013.01); *H04W 48/20* (2013.01); *H04W 84/045* (2013.01)

(56) References Cited

U.S. PATENT DOCUMENTS

| | | | |
|---|---|---|---|
| 2005/0101245 A1* | 5/2005 | Ahmavaara ............ H04M 15/00 | 455/1 |
| 2005/0113070 A1* | 5/2005 | Okabe .......................... | 455/411 |
| 2006/0140149 A1* | 6/2006 | Kim .................. H04L 29/06027 | 370/331 |
| 2006/0168655 A1 | 7/2006 | Grandmaitre et al. | |
| 2006/0171368 A1* | 8/2006 | Moinzadeh et al. .......... | 370/346 |
| 2007/0061397 A1* | 3/2007 | Gregorat ............ H04L 29/1216 | 709/203 |
| 2007/0214232 A1 | 9/2007 | Belimpasakis et al. | |
| 2007/0214608 A1 | 9/2007 | Mesnage et al. | |
| 2008/0037478 A1* | 2/2008 | Na .................... H04L 29/12311 | 370/338 |
| 2008/0095098 A1* | 4/2008 | McNamara et al. .......... | 370/328 |
| 2008/0159262 A1* | 7/2008 | Crable et al. ................ | 370/352 |
| 2009/0047947 A1 | 2/2009 | Giaretta et al. | |
| 2009/0086688 A1 | 4/2009 | Kvache et al. | |
| 2010/0070636 A1 | 3/2010 | Skog et al. | |
| 2012/0147834 A1 | 6/2012 | Zisimopoulos et al. | |
| 2012/0147872 A1 | 6/2012 | Zisimopoulos et al. | |
| 2012/0265889 A1 | 10/2012 | Skog et al. | |
| 2013/0005316 A1* | 1/2013 | Bienn et al. ................ | 455/417 |

FOREIGN PATENT DOCUMENTS

| | | |
|---|---|---|
| WO | 2006/018533 A2 | 2/2006 |
| WO | 2006/077555 A1 | 7/2006 |
| WO | 2008/054270 A1 | 5/2008 |
| WO | 2009/018533 A2 | 2/2009 |
| WO | 2011/019159 A2 | 2/2011 |
| WO | 2011/021840 A2 | 2/2011 |

* cited by examiner

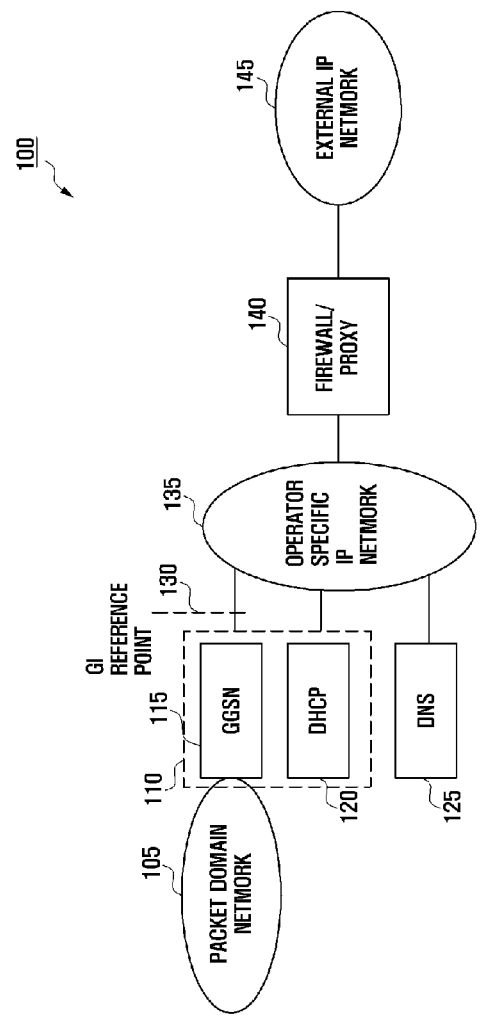

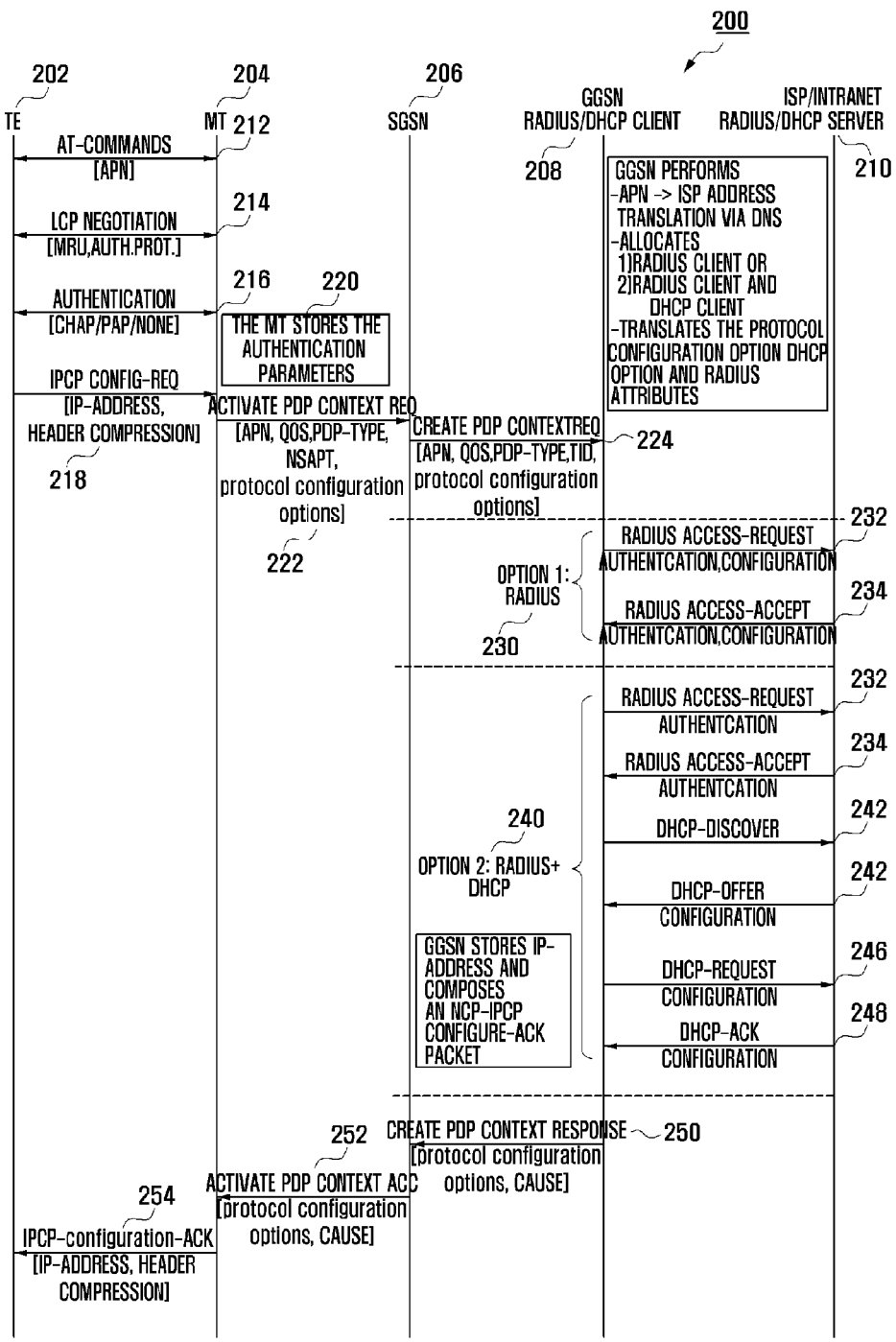
[Fig. 2]

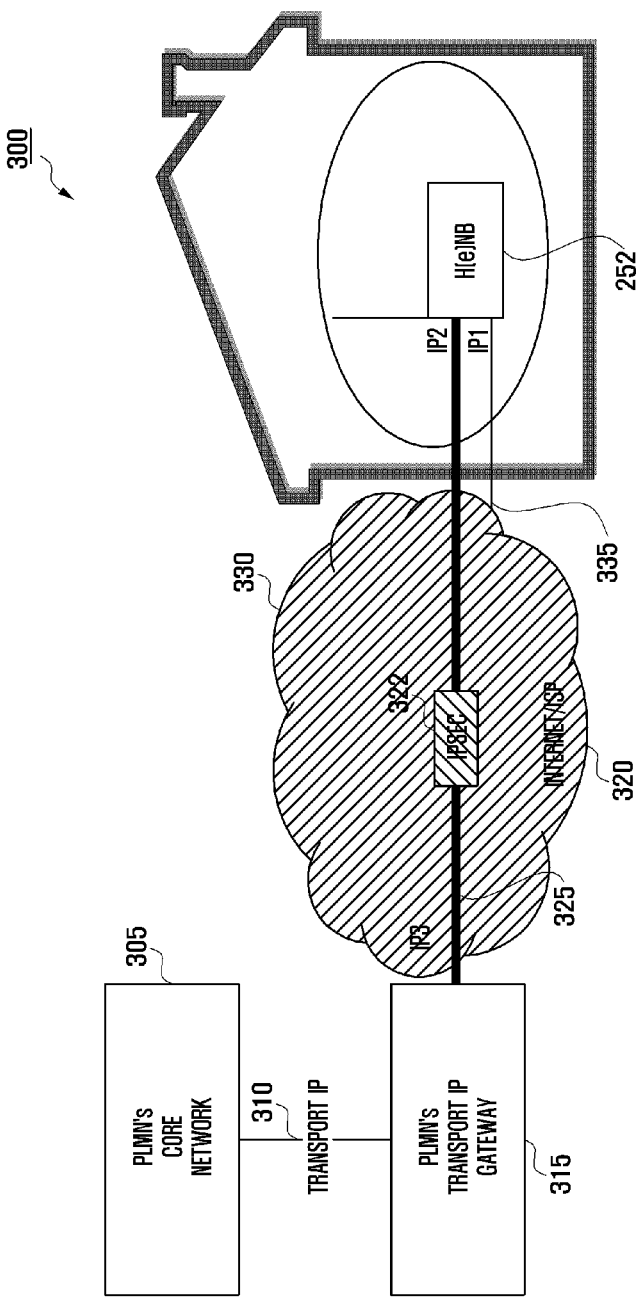
[Fig. 3]

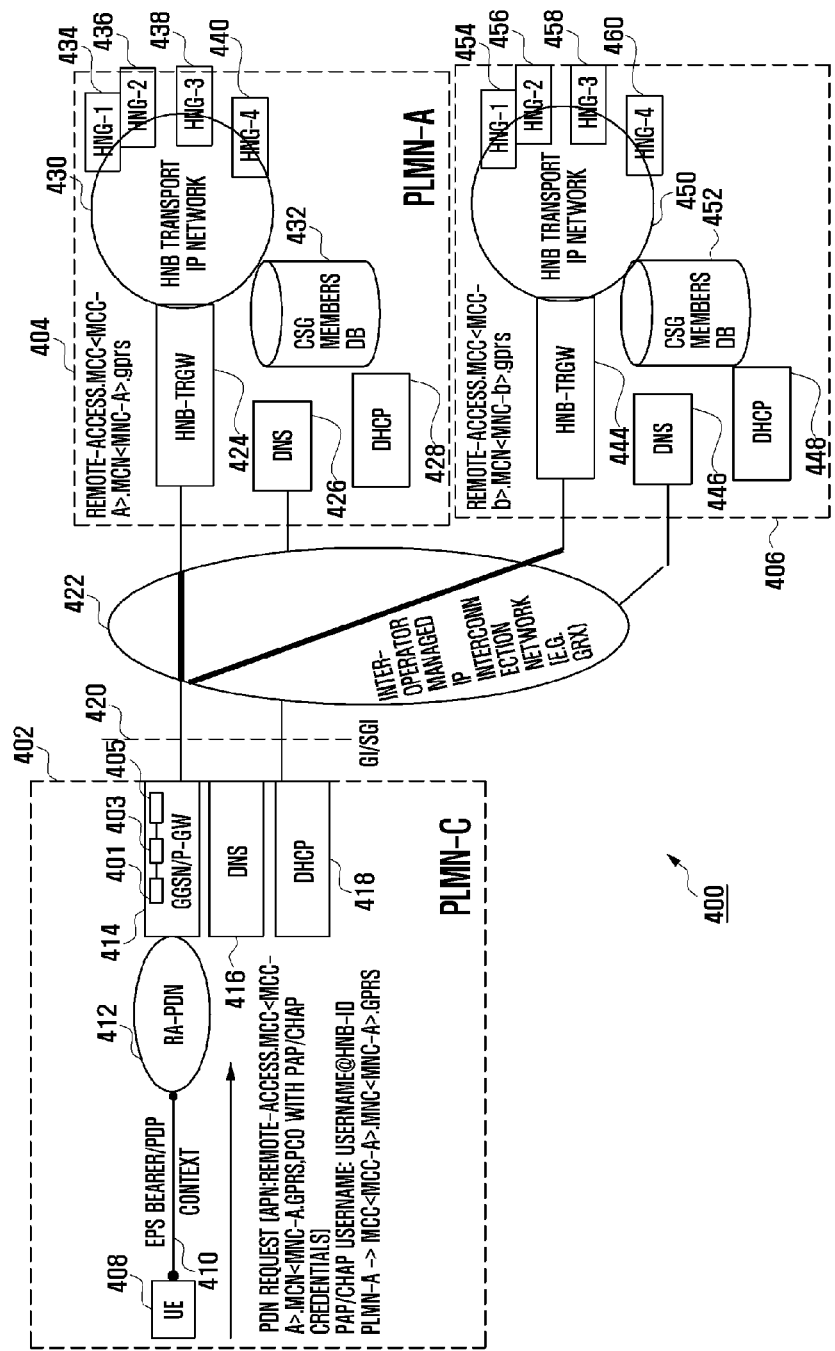
[Fig. 4]

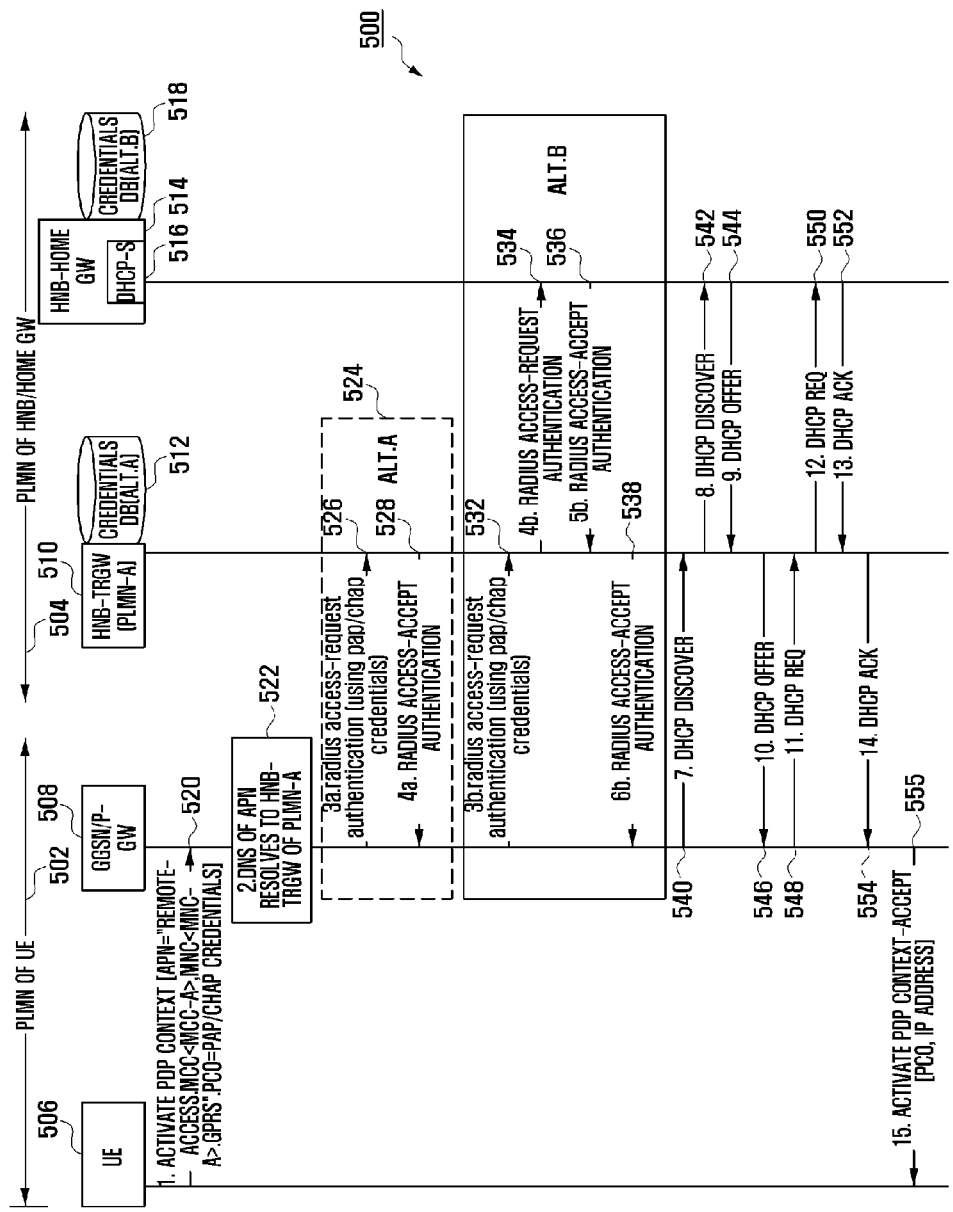
[Fig. 5]

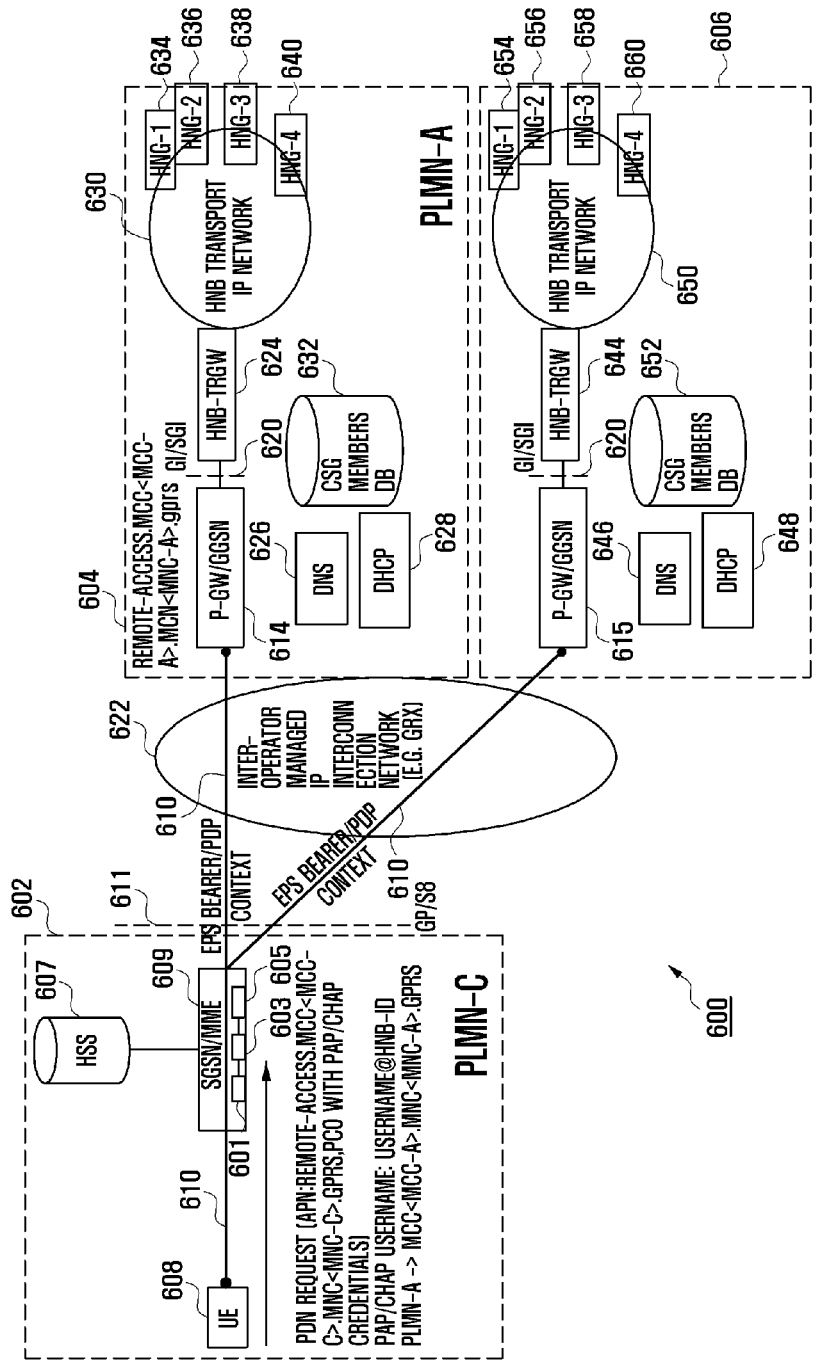
[Fig. 6]

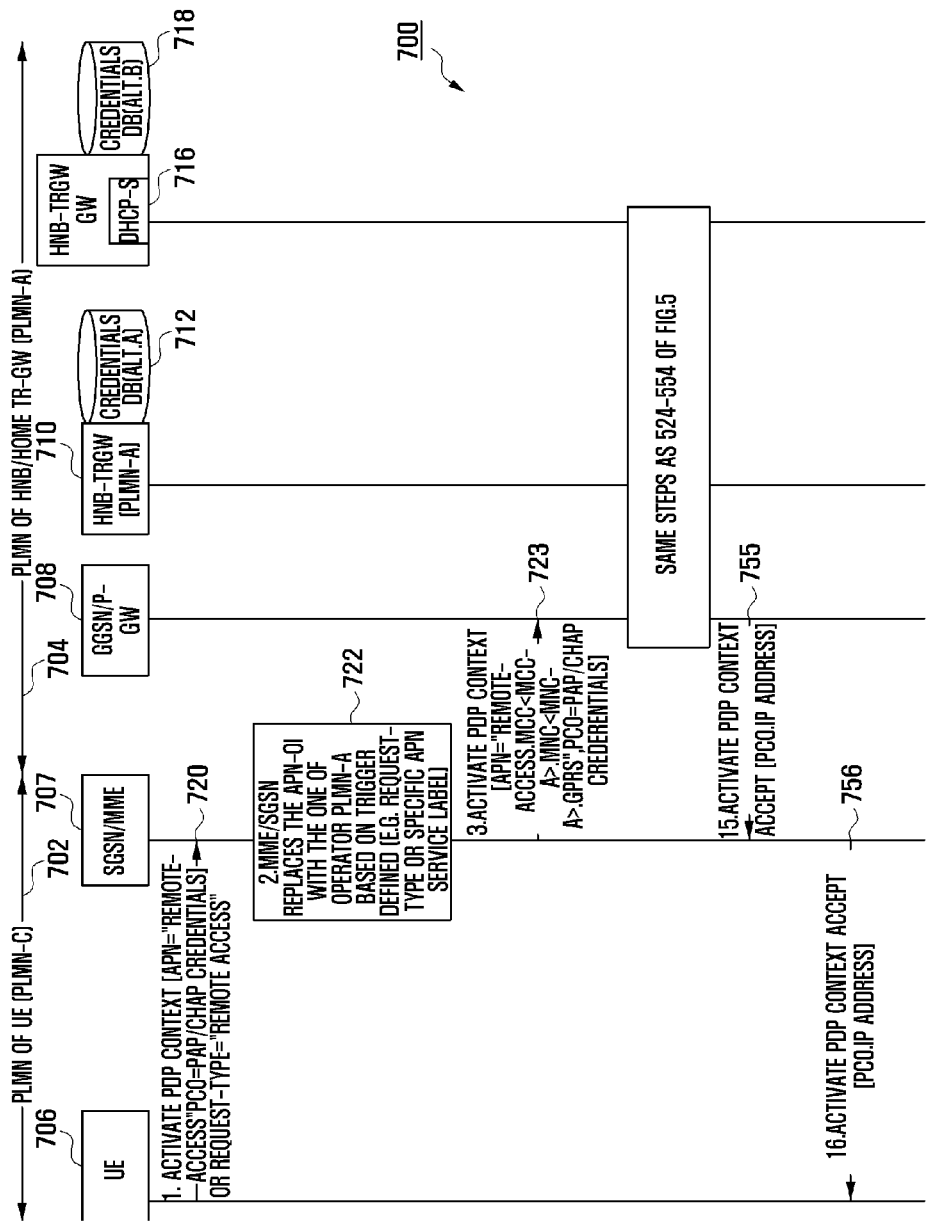
[Fig. 7]

[Fig. 8]
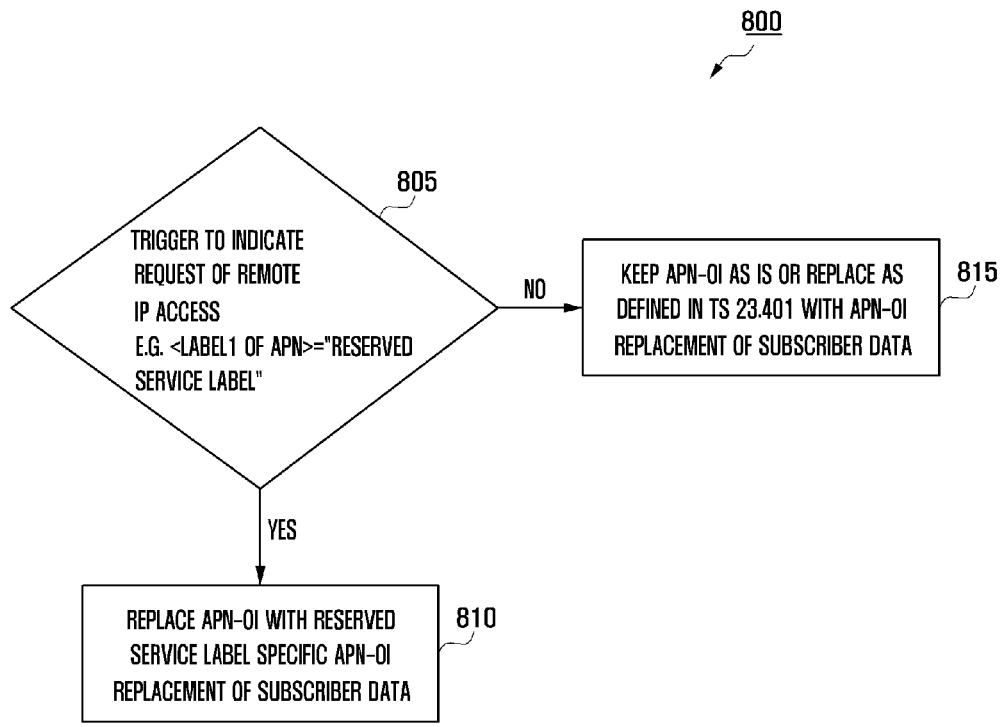

[Fig. 9]
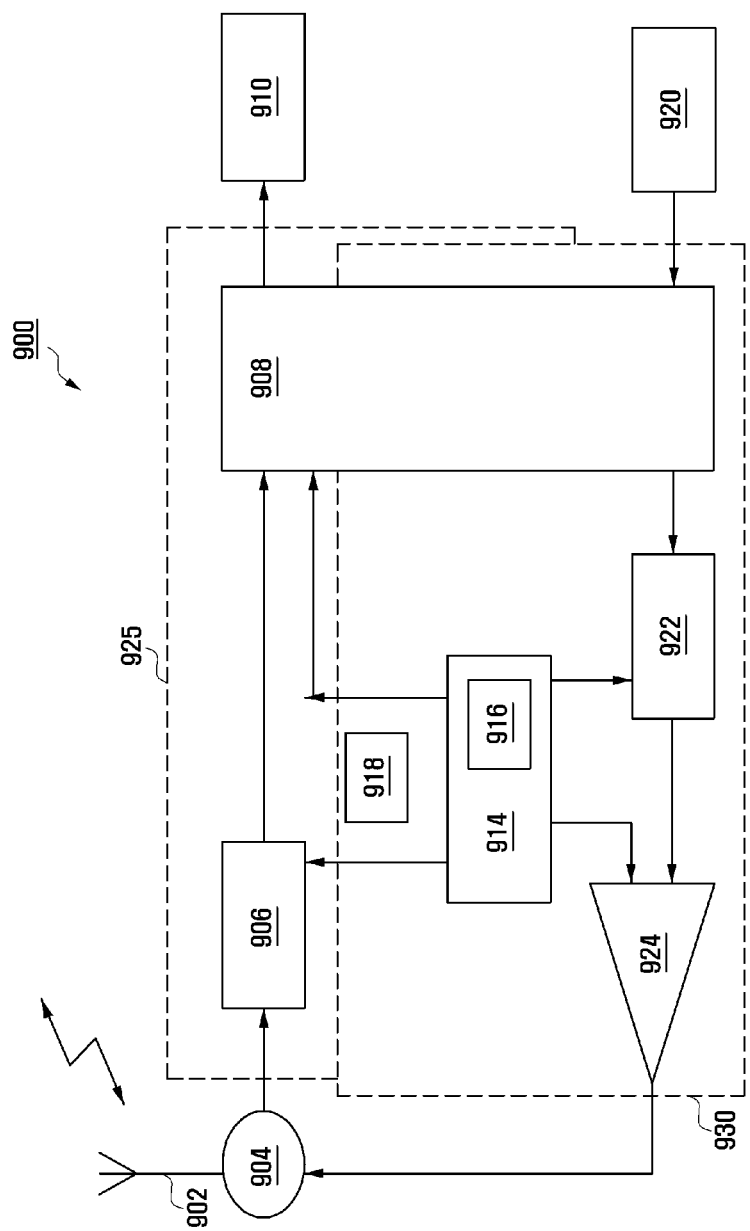

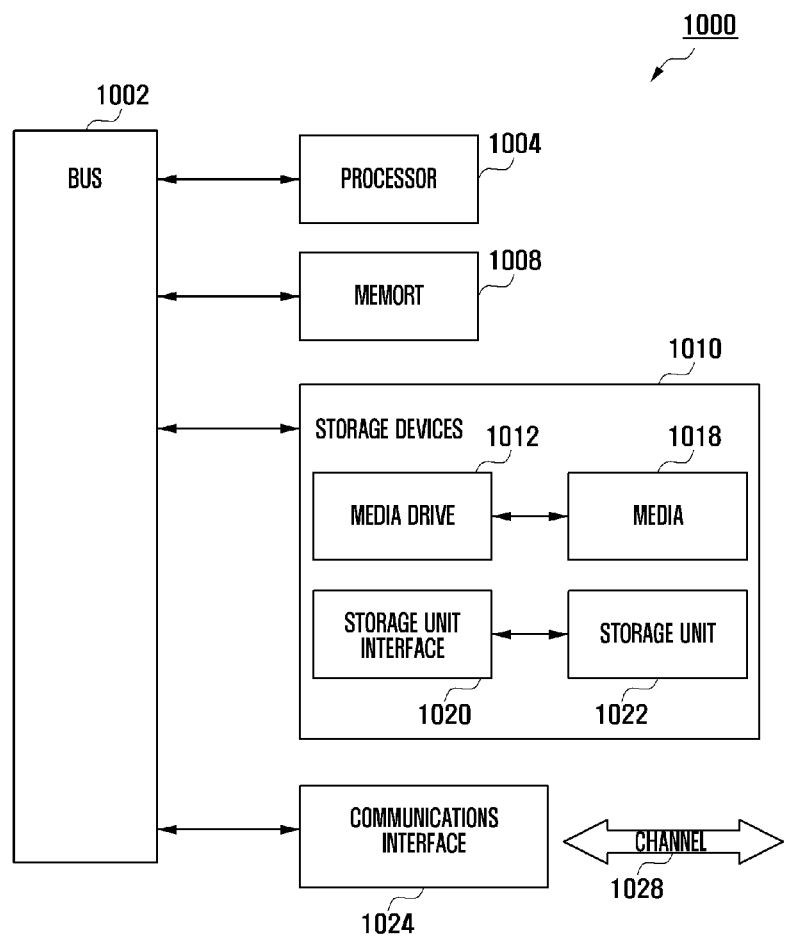
[Fig. 10]

NETWORK ENTITY, A WIRELESS COMMUNICATION UNIT AND METHODS FOR ACCESS TO A REMOTE PRIVATE IP NETWORK AND SUPPORTING THEREOF

TECHNICAL FIELD

The field of this invention relates to a network entity, a wireless communication unit and methods for accessing a remote private IP network and supporting thereof. The invention is applicable to, but not limited to, a wireless communication unit able to access a remote private IP network using independent connections of the wireless communication unit and its home network to different public land mobile networks (PLMNs).

BACKGROUND ART

Internet Protocol Security (IPsec) is a protocol suite for securing Internet Protocol (IP) communications by authenticating and encrypting each IP packet of a data stream. IPsec also includes protocols for establishing mutual authentication between agents at the beginning of the session and negotiation of cryptographic keys to be used during the session. IPsec can be used to protect data flows between a pair of hosts (e.g. computer users or servers), between a pair of security gateways (e.g. routers or firewalls), or between a security gateway and a host. IPsec is a dual mode, end-to-end, security scheme operating at the Internet Layer of the Internet Protocol Suite or OSI model Layer 3. Some other Internet security systems in widespread use, such as Secure Sockets Layer (SSL), Transport Layer Security (TLS) and Secure Shell (SSH), operate in the upper layers of these models. Hence, IPsec can be used for protecting any application traffic across the Internet. Applications need not be specifically designed to use IPsec. The use of TLS/SSL, on the other hand, must typically be incorporated into the design of applications.

In the field of Internet Protocol (IP) networks, access to a wireless communication unit's IP network (termed remote private IP network) is not currently possible using second generation (2G) wireless communication equipment, for example a global system for mobile (GSM) communication unit or 2 G communication unit capable of general packet radio system (GPRS) communications sometimes referred to as 2.5G capability).

Evolved Packet Core (EPC) is the IP-based core network defined by 3GPP in Release-8 for use by long-term evolution (LTE) and other access technologies. The goal of EPC is to provide a simplified all-IP core network architecture to efficiently provide access to various services, such as the ones provided in IMS (IP Multimedia Subsystem). EPC consists essentially of a Mobility Management Entity (MME) and access agnostic Gateways for routing of user datagrams.

However, currently, there is no known GPRS/EPC solution that exists to enable a wireless communication unit, such as a 3GPP user equipment (UE), to access its remote private IP network. In particular, no GPRS/EPC solution exists for a non-roaming UE to remotely access its private IP network, for example its home base station (sometimes referred to as a home Node B (HNB) or home evolved Node B (H(e)NB) in 3GPP parlance). Furthermore, no GPRS/EPC solution exists for a roaming UE to remotely access its private IP network, when the UE roams to other public land mobile networks (PLMNs). This is especially the case where the H(e)NB that serves as a Gateway does not belong to the same home (H-)PLMN of the UE.

The only known mechanism for providing access to the remote private IP network is for a wireless communication unit to access its remote private IP network over the Internet, using for example a secure tunneling mechanism, such as Encapsulating Security Payload (ESP) of the IPSec protocol suite, and using a Virtual Private Network (VPN). ESP tunnel mode encapsulates an IP data packet with ESP protocol, an IP header and an ESP authentication trailer. The ESP protocol also defines an authenticated format that provides data authentication and integrity, with data privacy. ESP takes the data carried by IP, such as a transmission control protocol (TCP) packet, and encrypts the TCP packet using an encryption algorithm and cryptographic key. The output is ciphertext that is difficult to decode without knowing the key. The receiving IPSec ESP entity uses an associated decryption algorithm and the same key to extract the original data. When IPSec tunnel mode is used, IPSec encrypts the IP header and the payload, whereas transport mode only encrypts the IP payload. Tunnel mode provides the protection of an entire IP packet by treating it as an authentication header (AH) or ESP payload. With tunnel mode, an entire IP packet is encapsulated with an AH or ESP header together with an additional IP header. The IP addresses of the outer IP header are the tunnel endpoints, and the IP addresses of the encapsulated IP header are the ultimate source and destination addresses. IPSec tunnel mode is useful for protecting traffic between different networks, when traffic must pass through an intermediate, un-trusted network. Tunnel mode is primarily used for interoperability with gateways, or end-systems that do not support L2TP/IPSec or PPTP connections.

It is known that a number of problems exist in providing access to the remote private IP network using the aforementioned secure tunneling mechanism. First, the secure tunneling mechanism requires the two ends (i.e. both the UE and the Home Gateway) to have public IP addresses, or at least private IP addresses that will require a number of notational address translations (NATs) when communications pass between the UE and Home Gateway. In addition, the secure tunneling mechanism requires the UE and Home Gateway to own and maintain IPSec credentials that can be used in order to establish security association between the UE and its remote private IP network. Even though maintenance of IPSec security credentials is a well-known procedure in the management of large scale IP networks, it is not used in a domestic, small scale IP network for domestic users. Furthermore, IPsec capability is not a feature that is supported in a majority of present-day UEs.

It is also known that 3GPP-style quality of service (QoS) management (for example as defined in TS 23.401[1] and TS 23.060[5]) cannot be performed in a virtual private network (VPN) that is using an IPSec tunneling mechanism over the Internet. Hence, if a UE is attempting to access a type of traffic that requires special handling, the UE will only be provided with a "best effort" QoS service, since the PLMN in which the UE is attached is unable to differentiate between different types of IP traffic provided from the remote private IP network.

Hence, the current solution of using IPSec over the public Internet in order to establish VPN and access the remote private IP network is a suboptimal procedure that requires a significant administrative load for the average user. In addition, especially for enterprise corporate networks, using IPSec over the public Internet in order to establish VPN and access the remote private IP network requires the UE to support special software.

Referring now to FIG. 1, a known architecture 100 (as shown in TS 29.061[3] of 3GPP rel.99) that could be used to establish VPN connectivity to remote private IP managed networks is illustrated. This architecture is based on the principle that the mobile network's home PLMN(HPLMN) Gateway (for example a P-GW or GGSN) connects with the external IP network. The architecture 100 includes a packet domain network 105 attached to a GGSN 115 in a remote private IP network 110. The remote private IP network 110 also includes a DHCP entity 125. The remote private IP network 110 is operably coupled to an Operator-specific IP network 135 via a Gi reference interface 130. A domain name server (DNS) 125 is also coupled to the Operator-specific IP network 135. The Operator-specific IP network 135 is coupled to an external IP network 145 via a firewall or proxy function 140.

Referring now to FIG. 2, a message sequence chart 200 illustrates an accessing of a remote packet data network (PDN) belonging to an external Intranet/ISP using a known mechanism and the GPRS/EPC architecture 100 of FIG. 1. A static or a dynamic IPv4 address belonging to the Intranet/ISP addressing space is allocated to a UE at IP-CAN session establishment. If requested by the UE at IP-CAN session establishment, the P-GW may retrieve the Protocol Configuration Options or IPv4 configuration parameters from a locally provisioned database in P-GW and/or from some external server (i.e. DHCPv4, RADIUS AAA, Diameter AAA) belonging to the Intranet/ISP. The communication between the Packet Domain and the Intranet/ISP may be performed over any network, even an insecure network, e.g. the Internet. In case of an insecure connection between the P-GW and the Intranet/ISP, there may be a specific security protocol in between. This security protocol is defined by mutual agreement between PLMN operator and Intranet/ISP administrator.

The methods of allocating IP address to the UE are specified in 3GPP TS 23.060[5], 3GPP TS 23.401[1] and 3GPP TS 23.402[4]. The allocated IPv4 address is used for packet forwarding within the P-GW and for packet forwarding on the Intranet/ISP. The message sequence chart 200 details the communications between terminal equipment (TE) 202, an associated mobile terminal (MT) 204, a serving general packet radio system (GPRS) support node (SGSN) 206, a gateway GPRS support node 208 and an internet service provider (ISP) or intranet communication network 210 involved in allocating the IPv4 address to the UE. The TE 202 and associated MT 204 transfer at least one or more of the following:

(i) AT commands 212, including an access point name (APN), (ii) LCP negotiation commands 214, including MRU commands and authentication protection, (iii) authentication commands 216, including CHAP, PAP commands, (iv) PCP configuration requirements 218, including IP address information, header compression, etc.

The MT 204 stores authentication parameters received from the TE 202 in step 220.

Furthermore, upon receiving a packet control protocol (PCP) configuration requirements message 218 from the TE 202, the MT 204 initiates an activate packet data packet (PDP) context requirements message 222 to the SGSN 206. The PDP context requirements message 222 comprises APN, quality of service (QoS), PDP-type, NSAPI, protocol configuration options. In response thereto, the SGSN 206 sends, in step 224, a create PDP context requirements message to the GGSN 208. The create PDP context requirements message comprises APN, QoS, PDP-type, NSAPI, protocol configuration options.

There are two known options for allocating a static or a dynamic IPv4 address belonging to the Intranet/ISP addressing space to a UE at IP-CAN session establishment. A first option 230 uses a RADIUS access request by the GGSN 208 to the ISP/intranet 210 following receipt of a create PDP context requirements message, as shown in step 232, and an acceptance, as shown in step 234, returned from the ISP/intranet 210 to the GGSN 208 with authentication and configuration information. A second option 240 also uses a RADIUS access request by the GGSN 208 to the ISP/intranet 210 following receipt of a create PDP context requirements message, as shown in step 232, and an acceptance, as shown in step 234, returned from the ISP/intranet 210 to the GGSN 208 with authentication and configuration information. However, the second option further comprises a DHCP-DISCOVER message being sent by the GGSN 208 to the ISP/intranet 210 in step 242 and a DHCP-OFFER message being returned in response to the discover message, as shown in step 244. Thereafter, the second option further comprises a DHCPREQUEST message being sent by the GGSN 208 to the ISP/intranet 210 in step 246 and a DHCPACK (acknowledge) message being returned in response to the request message, as shown in step 248.

The GGSN 208 then sends, in step 250, a create PDP context response message to SGSN 206. The create PDP context response message comprises protocol configuration options and a cause. In response thereto, the SGSN 206 sends an Activate PDP context Acc message to the MT 204, in step 252, where the Activate PDP context Acc message comprises protocol configuration options and the cause. The MT 204 then sends a PCP Configuration-Ack message to the TE 202 in step 254 with the IP-address and header compression to be used.

Thus, as a part of the IP-CAN session establishment, the P-GW may request user authentication from an external AAA server (i.e. RADIUS, Diameter) belonging to the Intranet/ISP. Furthermore, the GGSN 208 stores the IP-address and composes an NCP-IPCP Configure-Ack packet.

In addition to the above problems with known access mechanisms, the existing requirements in TS 22.220 of 3GPP, for Managed Remote Access limit remote access to the home based network, limit access to only those UEs that are members of the Closed Subscriber Group (CSG). Although restricting remote access to CSG members potentially provides the H(e)NB Hosting Party with a simple level of control over those UEs that are able to remotely connect to the remote private IP network, it is believed that this potentially represents a lost revenue opportunity for the Operator to which the H(e)NB is affiliated. For example, a mechanism is already required to enable access restriction on a per-subscriber basis, even if the subscriber is a CSG member. The present requirements for remote access to a home based network in Release 9 of TS 22.220 are as follows:

(i) The H(e)NB may support remote access for a CSG member to the home based network from a UE via a PLMN in order to provide access to IP capable devices connected to the home based network.

(ii). It shall be possible to restrict the access to the home based network on per-subscriber basis (e.g. some subscribers may have managed access to their home network and others may not).

DISCLOSURE OF INVENTION

Technical Problem

By the way, the first requirement limits access to the remote private IP network only to the CSG member, and thereby only to subscribers of PLMNs that have a roaming agreement with the HPLMN that supports the H(e)NB. Whilst it would seem reasonable to restrict access to the remote private IP network using the UTRA/E-UTRA air interface only to UEs having 'valid' subscriptions, there is no such restriction to other devices in the home network that may be connected via other means, e.g. ethernet cable, wireless local area network (WLAN), etc. Thus, users of UEs having subscriptions with Operators not having a roaming agreement with the Operator supporting the H(e)NB may connect to the remote private IP network providing that they are not using the UTRA/E-UTRA air interface.

The second requirement allows the possibility for the H(e)NB Hosting Party to restrict remote access to the home based network for certain subscribers (which at present based on Release 8 of TS 22.220 have to be assumed to be CSG members), but without specifying any mechanism to do so. This implies that additional security mechanisms (over and above those provided by the PLMN) are envisaged in the H(e)NB for authentication of the UE attempting remote access.

Thus, a need exists for an improved network entity, a wireless communication unit and methods for managed remote IP access to remote private IP network therefor.

Solution to Problem

Accordingly, the invention seeks to mitigate, alleviate or eliminate one or more of the above mentioned disadvantages singly or in any combination. Aspects of the invention provide a network entity, a communication unit, integrated circuits and a method for remote private IPaccess and supporting remote access to a remote private IP network, as described in the appended claims.

According to a first aspect of the invention, there is provided a method for supporting access to a remote private internet protocol (IP) network. The method comprises, at a network entity, receiving an access request message from a wireless communication unit, wherein the access request message comprises an identifier; and determining from the identifier that the access request message indicates a remote access request to a remote private IP network of the wireless communication unit. The method further comprises sending an access acceptance message to the wireless communication unit.

Thus, in one example, the wireless communication unit is able to establish connectivity to a remote private IP network served by a wireless communication transmitter (H(e)NB) acting as a home gateway, without a need to have special added software in the wireless communication unit and using existing mechanisms and signalling.

In another example, the wireless communication unit is able to establish connectivity to a remote private IP network irrespective of whether or not the PLMN that is serving the wireless communication unit and the wireless communication transmitter (H(e)NB) that is serving the remote private IP network may be the same.

In another example of the invention the wireless communication unit is able to establish connectivity to a remote private IP network irrespective of whether or not the PLMN that is serving the wireless communication unit and the wireless communication transmitter (H(e)NB) may be the same. In this example, the internal DNS mechanisms that are currently in use in order to establish roaming connectivity between different operators PLMNs may be utilised.

According to an optional feature of the invention, the identifier in the access request message may comprise a remote private access allocated access point name (APN).

According to an optional feature of the invention, the access acceptance message may comprise an IP address of the remote private IP network of the wireless communication unit.

According to an optional feature of the invention, the method may further comprise informing the home network element of the access request message. In optional example, the informing may comprise replacing at least one information element within the access request message with an identifier of the remote private IP network of the wireless communication unit.

According to an optional feature of the invention, the replacing of at least one information element within the request may comprise replacing a first identifier identifying the Operator information of a remote network that is serving the wireless communication unit with a second identifier identifying the Operator information of the home network of the wireless communication unit. In a further optional example, the step of replacing the at least one information element with the second identifier may be achieved using an address provided by an internal domain name server (DNS) operably coupled to a gateway general packet radio service support node (GGSN) without needing to resolve the access request through a public Internet DNS operation.

According to an optional feature of the invention, the network entity may be a gateway general packet radio service support node (GGSN) or packet gateway (P-GW) located in one of: the public land mobile network (PLMN) of the remote private IP network that is to be accessed by wireless communication unit or the PLMN of the network entity.

According to an optional feature of the invention, the network entity may be a serving general packet radio service support node (SGSN) or mobility management entity (MME) located in a visiting public land mobile network (PLMN) that is serving the wireless communication unit and the network entity is arranged to select a packet gateway (PGW) IP address of the VPLMN to replace the at least one information element.

According to an optional feature of the invention, the step of replacing may comprise accessing a home subscriber server (HSS) of the wireless communication unit, operably coupled to the SGSN or MME, and extracting therefrom the identifier of the remote private IP network to be used in replacing the at least one information element According to an optional feature of the invention, the method may further comprise forwarding the access request from the MME or SGSN, following resolving of the identifier, to a GGSN or P-GW that is located in the home public land mobile network (PLMN) of the wireless communication unit.

According to an optional feature of the invention, the method may further comprise identifying an IP address of a home network entity Transport IP gateway or home gateway connected to the home PLMN of the wireless communication by resolving a fully qualified domain name (FQDN) of a service specific identifier, combined with the Network Operator information.

According to an optional feature of the invention, the step of replacing may comprise the step of replacing at least one information element within the access request message with an identifier of the remote private IP network of the wireless communication unit is performed in one of the following:

(i) where both the wireless communication unit and a serving base station of the private IP network are located in the same HPLMN;

(ii) where both the wireless communication unit the serving base station of the private IP network are supported by the same HPLMN, and the UE is roaming to a VPLMN that has a roaming agreement with the HPLMN;

(iii) where both the wireless communication unit the serving base station of the private IP network are supported by different HPLMNs and a roaming agreement exists between the two different PLMNs; and (iv) where both the wireless communication unit the serving base station of the private IP network are supported by different HPLMNs are supported by different HPLMNs, and no roaming agreement exists between the different PLMNs.

According to an optional feature of the invention, the identifier may be dedicated as one from a group of: a service specific label in the identifier, a service specific request-type identifier.

According to a second aspect of the invention, there is provided a computer program product comprising executable program code for supporting access to a remote private internet protocol (IP) network. The computer program product comprising program code operable for: receiving an access request message from a wireless communication unit, wherein the access request message comprises an identifier; and determining from the identifier that the access request message indicates a remote access request to a remote private IP network of the wireless communication unit. The computer program product also comprises program code operable for sending an access acceptance message to the wireless communication unit.

According to a third aspect of the invention, there is provided an integrated circuit for a network entity for supporting access to a remote private internet protocol (IP) network. The integrated circuit comprises a receiver module arranged to receive an access request message from a wireless communication unit, wherein the access request message comprises an identifier; a signal processing module operably coupled to the receiver module and arranged to determine from the identifier that the access request message indicates a remote access request to the remote private IP network of the wireless communication unit; and a transmitting module arranged send an access acceptance message to the wireless communication unit.

According to a fourth aspect of the invention, there is provided a network entity for supporting access to a remote private internet protocol (IP) network by a wireless communication unit, the network entity comprises a receiver module arranged to receive an access request message from a wireless communication unit, wherein the access request message comprises an identifier; and a signal processing module operably coupled to the receiver module and arranged to determine from the identifier that the access request message indicates a remote access request to the remote private IP network of the wireless communication unit. The network entity further comprises a transmitting module arranged to send an access acceptance message to the wireless communication unit.

According to a fifth aspect of the invention, there is provided a method for remotely accessing a remote private internet protocol (IP) network. The method comprises, at a wireless communication unit, generating a request for remotely accessing a remote private IP network wherein the request comprises an identifier indicative of a remote access request; receiving an access acceptance message from the network entity that comprises an IP address of the remote private IP network of the wireless communication unit; and communicating with the remote private IP network of the wireless communication unit using the IP address provided based on the identifier.

According to a sixth aspect of the invention, there is provided a computer program product comprising executable program code for remotely accessing a remote private internet protocol (IP) network. The computer program product comprises program code operable for generating a request for remotely accessing a remote private IP network wherein the request comprises an identifier indicative of a remote access request; receiving an access acceptance message from the network entity that comprises an IP address of the remote private IP network of the wireless communication unit; and communicating with the remote private IP network of the wireless communication unit using the IP address provided based on the identifier.

According to a seventh aspect of the invention, there is provided an integrated circuit for a wireless communication unit for remotely accessing a remote private internet protocol (IP) network. The integrated circuit comprises a signal processing module arranged to generate a request for remotely accessing a remote private IP network, wherein the request comprises an identifier indicative of a remote access request. The integrated circuit further comprises a transmitter operably coupled to the signal processing module and arranged to transmit the request to a network entity; and a receiver operably coupled to the signal processing module and arranged to receive an access acceptance message, wherein the access acceptance message comprises an IP address of the remote private IP network of the wireless communication unit generated by the network entity in response to the identifier.

According to an eighth aspect of the invention, there is provided a wireless communication unit comprising: a signal processing module arranged to generate a request for remotely accessing a remote private internet protocol (IP) network, wherein the request comprises an identifier indicative of a remote access request. The wireless communication unit further comprises a transmitter operably coupled to the signal processing module and arranged to transmit the request to a network entity; and a receiver operably coupled to the signal processing module and arranged to receive an access acceptance message, wherein the access acceptance message comprises an IP address of the remote private IP network of the wireless communication unit generated by the network entity in response to the identifier.

These and other aspects of the invention will be apparent from, and elucidated with reference to, the embodiments described hereinafter.

Advantageous Effects of Invention

The present invention provide a network entity, a communication unit, integrated circuits and a method for remote private IPaccess and supporting remote access to a remote private IP network, as described in the appended claims.

BRIEF DESCRIPTION OF DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

FIG. 1 illustrates an external PDN connection architecture as described in TS 29.061.

FIG. 2 illustrates a known signalling flow for accessing remote PDN as described in TS29.061.

FIG. 3 illustrates an example diagram of a home evolved Node B (H(e)NB) Transport IP architecture.

FIG. 4 illustrates an example architecture of remote private IP access with the GGSN/P-GW located in a UE's serving Visitor PLMN (VPLMN).

FIG. 5 illustrates an example signalling flow for remote private IP access for the architecture of FIG. 4.

FIG. 6 illustrates an example architecture of remote private IP access with the GGSN/P-GW located in the H(e)NB's PLMN.

FIG. 7 illustrates an example signalling flow for remote private IP access for the architectures of FIG. 6.

FIG. 8 illustrates an example of a MME or SGSN APN resolution procedure for a remote private IP access request employed in the architecture of FIG. 6.

FIG. 9 illustrates a simplified overview of a wireless communication unit adapted in accordance with some example embodiments of the invention.

FIG. 10 illustrates a typical computing system that may be employed to implement signal processing functionality in embodiments of the invention.

MODE FOR THE INVENTION

Within universal mobile telecommunication systems (UMTS), a Node B is a term used to refer to a base transceiver station (BTS) in a macro-cell radio access network (RAN) that provides a wireless interface to mobile/wireless communication units. Within the 3rd generation partnership project standardisation process (3GPP), a Home Node B (HNB) refers to 3GPP's term for a 3G femtocell, which performs many of the function of a Node B, but is optimized for deployment in a home/residential environment.

Long Term Evolution (LTE) is the last step toward a 4th generation of radio technologies designed to increase the capacity and speed of mobile telecommunication networks. Within the LTE standardisation process, the enhanced performance/functionality to be provided by NodeBs and HNBs has resulted in these RAN entities being referred to as evolved NodeBs (eNBs) or home evolved NodeBs (H(e)NBs).

In telecommunications, a public land mobile network (PLMN) is a network that is established and operated by an administration or by a recognized operating agency (ROA) for the specific purpose of providing land mobile telecommunications services to the public. A PLMN is identified by the Mobile Country Code (MCC) and the Mobile Network Code (MNC). Each operator providing mobile services has its own PLMN. PLMNs interconnect with other PLMNs and Public switched telephone networks (PSTN) for telephone communications or with internet service providers for data and internet access of which links are defined as interconnect links between providers.

Access to PLMN services is achieved by means of an air interface involving radio communications between mobile phones or other wireless enabled user equipment and land based radio transmitters or radio base stations. A home PLMN (HPLMN) refers to the PLMN that the wireless communication unit (or user equipment (UE)) is registered with. A visitor PLMN (VPLMN) refers to the PLMN that the wireless communication unit or UE has roamed into.

For the purpose of understanding the examples hereinafter described, it is worth noting that references to eNBs, H(e)NBs, NodeBs, HNBs, etc. refer to a serving 'base station' that is providing a wireless link from the wireless communication unit/UE to the network. Hence, such base stations may either reside in the wireless communication unit's/UE's HPLMN or in a different PLMN. References to a serving base station, in the hereinafter described examples, encompass both base stations that comprise transceiver circuits to wirelessly communicate with wireless communication units/UEs as well as transceiver?ess base stations that function as a gateway. Furthermore, for the purpose of understanding the examples hereinafter described, it is worth noting that references to remote private IP network refer to an Internet Protocol (IP) network that is served by an eNB, H(e)NB, NodeB or HNB and is remote from a current location of the wireless communication unit/UE. An example of the remote private IP network may be a residential or enterprise IP network that the subscriber of the wireless communication unit requires to access.

Examples of the invention will be described in terms of a 3GPP UE roaming into a non-home public land mobile network (PLMN) and desiring to acquire access to a remote private IP network via its serving eNB, H(e)NB, NodeB or HNB. However, it will be appreciated by a skilled artisan that the inventive concept herein described may be embodied in any type of wireless communication unit desiring to acquire access to a home IP network.

In particular, examples herein described aim to provide a solution where both a wireless communication unit/UE and a serving base station in a form of eNB, H(e)NB, NodeB or HNB of the remote private IP network are attempting remote access and are located in the same HPLMN. Furthermore, examples herein described aim to provide a solution where the serving eNB, H(e)NB, NodeB or HNB of the remote private IP network and the UE attempting remote access are supported by the same home PLMN (HPLMN), but the UE is roaming to a visiting PLMN (VPLMN) that has a roaming agreement with the HPLMN. In addition, examples herein described aim to provide a solution where the serving eNB, H(e)NB, NodeB or HNB of the remote private IP network and the UE attempting remote access are supported by different HPLMNs, but a roaming agreement exists between the two PLMNs. Also, examples herein described aim to provide a solution where the serving eNB, H(e)NB, NodeB or HNB of the remote private IP network and the UE attempting remote access are supported by different HPLMNs, and no roaming agreement exists between the PLMNs.

In one example, a modification to the known procedure illustrated in FIG. 2 is proposed, whereby the modification enables the usage of the basic procedure for the UE to be extended to cases where the UE and remote PDN (for example a home network or a corporate network) reside and connect to different PLMNs. In this example, the UE is able to use its H(e)NB acting as a home network Gateway in order to establish a virtual private network (VPN) using 3GPP EPC and/or GPRS procedures in order to access the remote private IP network. The UE is also able to become authenticated and acquire an IP address from a range allocated to the remote private IP network, in order to obtain access. Advantageously, the UE is able to re-use existing 3GPP architecture and procedures to enable it to establish connectivity with the home based network, without requiring that the UE is a subscriber to the same PLMN to which the remote private IP network is connected, or indeed without requiring that the UE is a CSG member of the serving eNB, H(e)NB, NodeB or HNB of the remote private IP network.

In particular, in one example, a UE is able to access a managed remote private IP network without the UE having to obtain access to the public Internet. This is achieved using modified functionality of an eNB, H(e)NB, NodeB or HNB as a gateway in order to provide access to the managed remote private IP network. In this manner, the eNB, H(e)NB, NodeB or HNB need not belong to the same home PLMN of the UE attempting remote access.

Referring now to FIG. 3, an example diagram of a home evolved Node B (H(e)NB) Transport IP architecture 300 is illustrated. The (H(e)NB Transport IP architecture 300 comprises a H(e)NB 340 located in a building. The H(e)NB comprises two Internet Protocol (IP) links to external networks, for example a first IP link to the Internet or an Internet Service Provider (ISP) 320 and a second IP link that is linked to an IPSec module 322. The IPSec module 322 is coupled to a public land mobile network (PLMN) Transport IP gateway 315 via a third IP link (IP3) 325. The PLMN Transport IP gateway 315 is coupled to the PLMN's Core Network 305 via a Transport IP link 310.

The H(e)NB 340 is commonly connected to a Transport IP Gateway 315 (commonly an IPSec concentrator) that belongs to the PLMN of the H(e)NB 340. In this respect the H(e)NB has two IP addresses: a first IP address 315 that connects it to the public Internet (e.g. through an ISP) and a second IP address (IP2) 330 that connects it to the operator's Transport IP Gateway. As a result the PLMN that the H(e)NB connects to has direct IP access to the H(e)NB 340 and is able to direct traffic in the H(e)NB internal network from the PLMN's core network 305.

Thus, in one example embodiment, a remote wireless communication unit (not shown), for example a user equipment (UE), is able to access its H(e)NB 340 utilizing the transport IP connectivity of the H(e)NB 340, without necessarily needing to utilize the transceiver functionality of the H(e)NB. This is due to the connectivity of the home devices to the H(e)NB device in an IP layer being independent of whether or not the physical layer of the H(e)NB device is, say, a 3GPP air interface or any other wireless or wired means, for example Ethernet, Wi-Fi, etc.

Thus, in this example, no special software needs to be installed in the UE to support remote private IP access to its H(e)NB 340. Furthermore, the Home Gateway (the PLMN transport IP gateway 315) does not need to provide any extra functionality from the one normally provided from, say, a known HNB, H(e)NB.

Hence, remote private IP access to a UE's H(e)NB 340 need not rely on the transceiver functionality of the H(e)NB, but on its connectivity to the operator's backend transport IP network. In this respect this proposed operation is independent from, and can be incorporated in, any Home Gateway device implementation irrespective of whether it is using the transceiver functions of H(e)NB.

The H(e)NB is a smaller form factor of the (e)NB (as described in TS 36.300) and its purpose is to serve users within a home environment with better access quality and faster speeds. The 2O usual deployment scenario utilises the IP access that is commonly offered in the home (e.g. ADSL) and is provided by a different operator to the PLMN, where that the H(e)NB is configured to serve. The 'backhaul' Operator can be any Internet Service Provider (ISP) that provides Internet services at home, without any operational relationship with the Operator that provides the H(e)NB. In order, though, to secure the User plane and Control Plane traffic the operator of the H(e)NB needs to be 25 able to provide a degree of transport level security as well as integrate the H(e)NB in its internal network management system for management and configuration purposes. For these reasons a Transport IP GW will be commonly placed at the edge of the Operator's Core or Radio Access network, depending on whether or not the optional element of H(e)NB GW is deployed.

Two architecture and signalling flow examples are now described that support a UE remotely accessing its HeNB in the HPLMN. A first example utilises a mobility management entity (MME) that is adapted to select the PGW in the visitors PLMN (VPLMN). A second example utilises the mobility management entity (MME) that is adapted based on the user subscription profile to select the PGW in the home PLMN (HPLMN). When the MME first selects the PGW, the MME attempts to use a 'VPLMN Address Allowed'. If the VPLMN PGW is allowed to be selected, then in one example the inter-operator interaction is described to enable the UE to remotely access its H(e)NB using the VPLMN. If the VPLMN PGW is not allowed to be selected based on the user subscription profile, and only the UE's HPLMN PGW is allowed to be selected, then the MME is configured to select the PGW in the UE's HPLMN. In one example, the selection processes to be followed are dynamically configurable.

These operations are dependent upon the identifier (APN) that is returned. The DNS resolves the FQDN that is returned (after the identifier/APN replacement), which is resolved to the appropriate information element. Thus, if the serving PLMN is managed by Operator-01: and if the APN is identified as: 'remote-access.operator01.gprs', the IP address will be resolved to 'Operator-01's Transport-IP GW'. However, if the APN is replaced with 'remote-access.operator02.gprs', based on the reserved label APN-OI replacement element contained in the subscriber profile, it will resolve to the IP address of the 'Operator-02' Transport IP GW. In the latter example, the above replacement operation relies on the fact that the inter-operator interconnection network (e.g. GRX) has DNS entries for the Transport IP GWs of the different interconnected PLMNs.

Referring now to FIG. 4, a first example architecture for supporting a UE in remotely accessing its H(e)NB within its HPLMN is illustrated, with the GGSN/P-GW located in the H(e)NB's PLMN. In this example, the wireless communication system 400 is compliant with, and contains network elements capable of supporting communication over, an Evolved-UMTS terrestrial RAN (E-UTRAN) wireless communication system air-interface, which is currently under discussion and standardisation within 3GPP. This is also referred to as Long Term Evolution (LTE). As illustrated, a UE 408 has moved into a PLMN (PLMN-C 402) that is not its home PLMN. The UE 408 is operably coupled to a radio access packet data network (RA-PDN) 412 over an encapsulated (EPS) bearer packet data protocol (PDP) context. Within this remote PLMN-C 402, the RA-PDN 412 is operably coupled to the PLMN-C's gateway general packet radio system (GPRS) support node (GGSN)-packet data network (PDN) gateway (P-GW) 414. The GGSN/P-GW comprises a receiver module 401, a signal processing module 403 and a transmitter module 405. The remote PLMN-C 402 also comprises a Domain Name Server (DNS) 416, which is a hierarchical naming system for computers, services, or any resource participating in the Internet. The Domain Name System distributes the responsibility of assigning domain names and mapping those names to IP addresses by designating authoritative name servers for each domain. Authoritative name servers are assigned to be responsible for their particular domains, and in turn can assign other authoritative name servers for their sub-domains. This mechanism has made the DNS distributed, fault tolerant, and helped avoid the need for a single central register to be continually consulted and updated. The remote PLMN-C 402 also comprises a dynamic host configuration protocol (DHCP) module 418, where DHCP is a network application protocol used by devices (DHCP clients) to obtain configuration information for operation in an Internet Protocol network. This protocol reduces system administration workload, allowing devices to be added to the network with little or no manual intervention.

The remote PLMN-C 402 is operably coupled to other PLMNs, for example PLMN-A 404 and PLMN-B 406, via a Gi/SGi interface 420. PLMN-A 404 comprises a HNB (or H(e)NB) transport gateway (HNB-TrGW) 424, operably coupled to a HNB Transport IP network 430. A number of home network gateways HNG-1/4 434, 436, 438, 440 are coupled to the HNB Transport IP network 430. PLMN-A 404 also comprises Domain Name Server (DNS) 426 and DHCP module 428. PLMN-A 404 also comprises a database 432 of closed subscriber group (CSG) members. Similarly, PLMN-B 406 also comprises a HNB (or H(e)NB) transport gateway (HNB-TrGW) 444, operably coupled to a HNB Transport IP network 450. A number of home network gateways HNG-1/4 454, 456, 458, 460 are coupled to the HNB Transport IP network 450. PLMN-B 406 also comprises a Domain Name Server (DNS) 446 and a DHCP module 448. PLMN-B 406 also comprises a database 452 of closed subscriber group (CSG) members.

In this architecture 400, the GGSN/P-GW 414 where the PDP context/PDN connection terminates resides in the serving PLMN (i.e. PLMN-C) 402 of the UE 408. This architecture 400 provides a permanent tunneling mechanism 422 in order to transport the IP traffic from the GGSN/P-GW 414 to the transport GW (either HNB-TrGW 424 or HNB-TrGW 444) in the PLMN that connects the H(e)NBs in the transport IP layer and is the PLMN where this H(e)NB connects.

Referring now to FIG. 5, an example signalling flow 500 for remote private IP access for the architecture in FIG. 4 is illustrated. In this first example, as described in FIG. 4, the GGSN/P-GW 508 is located in the UE's serving PLMN, namely remote PLMN-C (i.e. PLMN-C 402 in FIG. 4).

The example signalling flow 500 details the communications within a remote PLMN 502 of the UE, within the PLMN of the UE's HNB/Home GW 504 and signalling flow therebetween. The signalling flow within remote PLMN 502 of the UE comprises signalling flow between the UE 506 and the remote PLMN's GGSN/P-GW 508. The signalling flow within the PLMN of the HNB/Home GW 504 comprises signalling flow between the HNB-TrGW 510 (coupled to an associated credentials database 512) and the HNB/Home GW 514 (also coupled to an associated credentials database 518). The HNB/Home GW 514 comprises a DHCP server 516.

The signalling flow to support remote access of the UE to its HNB (or H(e)NB) comprises the UE initiating an Activate PDP Context message 520 and forwarding this to the remote PLMN's GGSN/P-GW 508. Notably, the Activate PDP Context message 520 comprises an access point name (APN) that has been modified to be a 'remote access' name. The Activate PDP Context message 520 may also include quality of service (QoS), PDP-type, NSAPI, protocol configuration options. In response thereto, the DNS of the GGSN/P-GW 508 resolves the APN to an associated HNB-TrGW of the UE, namely PLMN-A 504, as shown in step 522.

Thus, in accordance with example embodiments of the invention, the APN name for remote private IP access, as indicated (and configured) by the UE 506, is dedicated as a service specific APN. Notably, this service specific APN is understood by the Network Operator's internal DNS as well as the Network Operator interconnection network. This APN needs to be resolved and sent to the HNB Transport IP GW (HNB TrGW) of the PLMN that is connected to the UE's H(e)NB.

FIG. 5 describes two optional signalling flows that may be employed in the architecture of FIG. 4, following receipt by the GGSN/P-GW 508 of an Activate PDP Context message 520 from the UE, where the DNS of the GGSN/P-GW 508 has resolved the APN of the Activate PDP Context message 520 to be a request for remote access to its HNB.

Thus, in FIG. 5, an example of a first optional signalling flow 524 (where the GGSN/P-GW is located in the UE's serving Visitor PLMN (VPLMN)) comprises a RADIUS access request being sent in step 526 by the GGSN/P-GW 508 to the PLMN of the HNB-TrGW 510 of the Home PLMN 504. The RADIUS access request includes authentication information (using for example PAP/CHAP credentials). In this example, the H(e)NB TrGW 510 generates an IP address that corresponds to a fully qualified domain name (FQDN) of the service specific APN, combined with the Network Operator information. Following receipt of this RADIUS access request, the HNB-TrGW 510 provides a RADIUS access acceptance message that includes the authentication details and the FQDN of the service specific APN to the GGSN/P-GW 508, as shown in step 528.

Furthermore, in FIG. 5, a second example of an optional signalling flow 530 comprises a RADIUS access request being sent in step 532 by the GGSN/P-GW 508 to the HNB-TrGW 510 of the Home PLMN 504. The RADIUS access request includes authentication information (using for example PAP/CHAP credentials), which are checked with the credentials in the database 512. Following receipt of this RADIUS access request, the HNB-TrGW 510 provides a RADIUS Access request message 534 to the HNB/Home GW 516, as shown in step 534, requesting authentication. In this example, the HNB/Home GW 516 generates an IP address that corresponds to a fully qualified domain name (FQDN) of the service specific APN, combined with the Network Operator information. Thereafter, the HNB/Home GW 516 sends a RADIUS access acceptance message that includes authentication details together with the FQDN of the service specific APN to the HNBTrGW 510, as shown in step 536. The HNB-TrGW 510 sends a RADIUS access acceptance message that includes authentication details to the GGSN/P-GW 508, as shown in step 538.

The GGSN/P-GW 508 then sends a DHCP-DISCOVER message to the HNB-TrGW 510 in step 540. The HNB-TrGW 510 also sends a DHCP-DISCOVER message to the HNB/Home GW 514 in step 542 and a DHCP-OFFER message is returned to the HNB-TrGW 510 in response to the discover message, as shown in step 544. The DHCP-OFFER message is also returned to the GGSN/P-GW 508 in response to the discover message sent by the GGSN/P-GW 508, as shown in step 546. Thereafter, the GGSN/P-GW 508 sends a DHCP-REQUEST message to the HNB TrGW 510 in step 548. The HNB-TrGW 510 also sends a DHCP-REQUEST message to the HNB/Home GW 514 in step 550 and a DHCP-ACK (acknowledge) message is returned to the HNB-TrGW 510 in response to the request message, as shown in step 552. The DHCP-ACK message is also returned to the GGSN/P-GW 508 in response to the DHCP-REQUEST message sent by the GGSN/P-GW 508, as shown in step 554.

The GGSN/P-GW 508 then sends, in step 556, an Activate PDP context Accept message to the UE 506, where the Activate PDP context Acc message comprises protocol configuration options and the IP address to be used to remotely access the UE's HNB.

Although examples have been described where the access acceptance message comprises an IP address of the remote private IP network of the wireless communication unit, in other examples the IP address allocation may be applied differently in other systems. For example, in one alternative example the P-GW/GGSN may act as a DHCP relay and the wireless communication unit may, thus, send a DHCP-DISCOVER directly similar to the IP address allocation described in TS 23.402.

Referring now to FIG. 6, a second example architecture for supporting a UE to remotely access its H(e)NB in its HPLMN is illustrated, using an SGSN/MME APN resolution procedure form remote private IP access request. In this example, the wireless communication system 600 is compliant with, and contains network elements capable of supporting communication over, an Evolved-UMTS terrestrial RAN (E-UTRAN) wireless communication system air-interface, which is currently under discussion and standardisation within 3GPP.

As illustrated, a UE 608 has moved into a PLMN (PLMN-C 602) that is not its home PLMN. The UE 608 is operably coupled to a serving general packet radio service (GPRS) support node (SGSN) and mobility management entity (MME) 609. The SGSN/MME comprises a receiver module 601, a signal processing module 603 and a transmitter module 605. The SGSN/MME 609 in PLMN-C 602 is operably coupled to a home subscriber service database 607. The remote PLMN-C 602 is operably coupled to other PLMNs, for example PLMN-A 604 and PLMN-B 606. The SGSN/MME 609 in PLMN-C 602 is operably coupled to PLMN-A 604 and PLMN-B 606 using an IP link supporting encapsulated (EPS) bearer packet data protocol (PDP) contexts.

In contrast to the architecture in FIG. 4, it is highlighted that PLMN-A 604 comprises a gateway general packet radio system (GPRS) support node (GGSN)-packet data network (PDN) gateway (P-GW) 614, which is configured to receive the encapsulated (EPS) bearer packet data protocol (PDP) contexts from the SGSN/MME 609 in PLMN-C 602. The GGSN/P-GW 614 is then operably coupled to HNB (or H(e)NB) transport gateway (HNB-TrGW) 624, via a Gi/SGi interface 620. The HNB-TrGW 624 is operably coupled to a HNB Transport IP network 630. A number of home network gateways HNG-1/4 634, 636, 638, 640 are coupled to the HNB Transport IP network 630. PLMN-A 604 also comprises Domain Name Server (DNS) 626 and DHCP module 628. PLMN-A 604 also comprises a database 632 of closed subscriber group (CSG) members.

Similarly, PLMN-B 606 comprises a gateway general packet radio system (GPRS) support node (GGSN)-packet data network (PDN) gateway (P-GW) 615, which is configured to receive the encapsulated (EPS) bearer packet data protocol (PDP) contexts from the SGSN/MME 609 in PLMN-C 602. The GGSN/P-GW 615 is then operably coupled to HNB (or H(e)NB) transport gateway (HNB-TrGW) 644, via a Gi/SGi interface 620. PLMN-B 606 also comprises a HNB (or H(e)NB) transport gateway (HNB-TrGW) 644, operably coupled to a HNB Transport IP network 650. A number of home network gateways HNG-1/4 654, 656, 658, 660 are coupled to the HNB Transport IP network 650. PLMN-B 606 also comprises Domain Name Server (DNS) 646 and DHCP module 648. PLMN-B 606 also comprises a database 652 of closed subscriber group (CSG) members.

In this architecture 600, the GGSN/P-GW 614 where the PDP context/PDN connection terminates resides in the serving PLMN (i.e. PLMN-C) 602 of the UE 608. This architecture 600 provides a tunneling mechanism 622 in order to transport the IP traffic from the GGSN/P-GW 614 to the transport GW (either HNB-TrGW 624 or HNB-TrGW 644) in the PLMN that connects the H(e)NBs in the transport IP layer and is the PLMN where this H(e)NB connects.

In the architecture of FIG. 6, it is assumed that the GGSN/P-GW 614 where the PDP context/PDN connection terminates, resides in the PLMN that serves the H(e)NB, for example either PLMN-A 604 or PLMN-B 606. In this architecture alternative, there is advantageously no requirement for a permanent tunneling mechanism to be provided in order to transport the IP traffic from the PLMN-C 602 that serves the UE 608 to the PLMN of the H(e)NB, since the roaming Gp/S8 interface 611, as defined in TS 23.003 is used instead. Thus, in this architecture alternative of FIG. 6, the SGSN/MME 609 (i.e. the entity that resolves the APN provided by the UE 608) apriori knows that a PDP context request with a specific APN is a request from the UE for remote private IP access to its H(e)NB network in another PLMN. Thus, the SGSN/MME 609 is configured to replace the APN-Operator Information element with an alternative APN, namely the Operator Information that is contained in this UE's/subscriber's profile information from within the HSS database 607.

Referring now to FIG. 7, an example signalling flow 700 for remote private IP access for the architecture in FIG. 6 is illustrated. In this second example, as described in FIG. 6, the GGSN/PGW 708 is located in the home PLMN (i.e. PLMN-A 604 in FIG. 6).

The example signalling flow 700 details the communications within a remote PLMN 702 of the UE 706, within the PLMN of the UE's HNB/Home GW 704 and signalling flow therebetween. The signalling flow within the remote PLMN 702 of the UE 706 comprises signalling flow between the UE 706 and the remote PLMN's SGSN/MME 707. The signalling flow within the PLMN of the HNB/Home GW 704 comprises signalling flow between the GGSN/P-GW 708, the HNB-TrGW 710 (coupled to an associated credentials database 712) and the HNB/Home GW 714 (also coupled to an associated credentials database 718). The HNB/Home GW 714 comprises a DHCP server 716.

The signalling flow to support remote access of the UE 706 to its HNB (or H(e)NB) comprises the UE initiating an Activate PDP Context message 720 and forwarding this to the remote PLMN's SGSN/MME 707. Notably, the Activate PDP Context message 720 comprises an access point name (APN) that has been modified to be a 'remote access' name. The Activate PDP Context message 720 may also include quality of service (QoS), PDP-type, NSAPI, protocol configuration options. In response thereto, the SGSN/MME 707 resolves the APN to an associated HNB-TrGW of the UE, namely PLMN-A 704, as shown in step 722. In particular, the SGSN/MME 707 replaces the APN of the Operator information with the corresponding Operator information in the UE's home PLMN, namely PLMN-A 704. This information is obtained from a HSS, for example HSS 607 in FIG. 6. Thus, the resolved APN is replaced and sent to the HNB Transport IP GW (HNB TrGW) of the home PLMN-A that is connected to the UE's H(e)NB.

Thus, in accordance with example embodiments of the invention, the APN for remote private IP access, as indicated (and configured) by the UE 706, is dedicated as a service specific APN. Notably, this service specific APN is understood by the Network Operator's internal DNS (of the UE's serving PLMN-A) as well as in the Network Operator interconnection network (e.g. GRX) internal DNS that is used to enable roaming. Referring back to FIG. 7, following receipt of an Activate PDP Context message 720 from the UE 706, the SGSN/MME 707 resolves the APN of the Activate PDP Context message 720 to be a request for remote access to its HNB, as shown in step 722. Thereafter, the SGSN/MME 707 sends an Activate PDP Context message 723 to the UE's home PLMN-A 704, in particular the GGSN/P-GW 708 located in the PLMN-A 704. Upon receipt of the Activate PDP Context message 723 from the SGSN/MME 707, the GGSN/P-GW 708 may follow the same optional (RADIUS-based and DHCP-based) steps 524-554 as described with reference to FIG. 5. Thus, for simplicity purposes, these steps will not be repeated here.

The GGSN/P-GW 708 then sends, in step 755, an Activate PDP context Accept message to the SGSN/MME 707, where the Activate PDP context Accept message comprises protocol configuration options and the IP address to be used to remotely access the UE's HNB. The SGSN/MME 707 then sends, in step 756, an Activate PDP context Accept message to the UE 706.

Thus, in accordance with the second example illustrated in FIG. 6 and FIG. 7, the SGSN or MME in the remote PLMN receives a 'trigger', for example in a form of an indicator of a remote access request. In response to the trigger, SGSN or MME in the remote PLMN replaces the APNOI of the APN as defined in TS 23.003 with the equivalent of the PLMN where the H(e)NB is located. Following the resolving operation, the SGSN or MME overwrites the APN and forwards the activate PDP context to the GGSN/P-GW of the PLMN where the H(e)NB is located, in order that the UE from a different serving PLMN (H or V-PLMN) can access the remote private IP network in the domain where the H(e)NB is located.

In accordance with one example, the flow of remote private IP access may include authentication with a HeNB Transport gateway (GW), in order to only allow HeNB authorised users to remotely access their own HeNB. In this example, the Transport GW acts as concentrator of all the IP traffic from/to the H(e)NB towards the Operator's Network. Since the network that is used as a backhaul for the H(e)NB can be provided by any internet service provider (ISP), the Transport GW may employ an IPSec tunnel towards the H(e)NB in order to secure the traffic (user plane and control plane) from/to the H(e)NB. Thus, the Transport GW IP address becomes part of the Network Operator's (PLMN) internal DNS, so that the request from the UE can resolve to it. In an example of a practical deployment, the network may utilise aspects of a H(e)NB GW, as defined in TS 36.300, although the H(e)NB GW aspects are not necessary to provide remote access to the remote private IP network.

In one example, one or more alternative indicator(s) may be used to cause the 'trigger', for example a 'service specific' label of the APN-Network Identifier (NI). In this example, an APN-NI may use a standardized format, for example a "remote-access" request type identifier, which would explicitly indicate to the MME/SGSN to replace the APN-OI with an equivalent from the UE's subscriber data that corresponds to the PLMN where the H(e)NB is located.

In a further example, one or more alternative indicator(s) may be used to cause the 'trigger', for example a "standardized service" label of the APN (label −1), as illustrated with respect to FIG. 8. Referring now to FIG. 8, an example of a MME/SGSN APN resolution procedure 800 for a remote private IP access request employed in the architecture of FIG. 6, is illustrated. The resolution procedure 800 commence with a receipt of a trigger, in step 805, for a request from a UE for a remote private IP access to its home NB. For example, the trigger may be of the form:

'Label1 of APN'=a reserved service label

If the trigger is determined as not being of the appropriate form, in step 805, the APN-OI of the PDP context request is maintained. Alternatively, if the APN-OI Replacement field exists in the subscription data, the P-GW/GGSN domain name may be constructed by replacing the APN OI with the value received in the APN OI Replacement field, as defined in TS 23.401 and as shown in step 815, with APN-OI replacement of subscriber data. If the trigger is determined as being of the appropriate form, in step 805, the P-GW/GGSN domain name will be constructed by replacing the APN-OI of the PDP context request with a reserved service label specific APN-OI, as shown in step 810.

In one example, access to the HeNB may be controlled on a per-subscriber basis. Thus, in this example, approved UEs are able to access the HeNB, and not just the UE dedicated to the HeNB. For example, a user may contain a personal UE and a work UE, where both UEs would be authorised to access the HeNB. In this example, the per-subscriber basis control may be achieved using the Home Subscriber Server (HSS) database, where the "non-authorised" users will not have the specific authorisation for remote residential access, namely a "Reserved Service Label Specific APN-OI Replacement" value in their subscriber data within the HSS database.

For completeness, the changes proposed to the subscriber information data described in TS 23.401 are highlighted (as bold and underlined) in the following table 1:

TABLE 1

| Field | Description |
|---|---|
| IMSI | IMSI is the main reference key. |
| MSISDN | The basic MSISDN of the UE (Presence of MSISDN is optional). |
| IMEI/IMEISV | International Mobile Equipment Identity - Software Version Number |
| MME Address | The IP address of the MME currently serving this MS. |
| MME Capabilities | Indicates the capabilities of the MME with respect to core functionality e.g. regional access restrictions. |

TABLE 1-continued

| Field | Description |
| --- | --- |
| MS PS Purged from EPS | Indicates that the EMM and ESM contexts of the UE are deleted from the MME. |
| ODB parameters | Indicates that the status of the operator determined barring |
| Access Restriction | Indicates the access restriction subscription information. |
| EPS Subscribed Charging Characteristics | The charging characteristics for the MS, e.g. normal, prepaid, flat-rate, and/or hot billing subscription. |
| Trace Reference | Identifies a record or a collection of records for a particular trace. |
| Trace Type | Indicates the type of trace, e.g. HSS trace, and/or MME/Serving GW/PDN GW trace. |
| OMC Identity | Identifies the OMC that shall receive the trace record(s). |
| Subscribed-UE-AMBR | The Maximum Aggregated uplink and downlink MBRs to be shared across all Non-GBR bearers according to the subscription of the user. |
| APN-OI Replacement | Indicates the domain name to replace the APN OI when constructing the PDN GW FQDN upon which to perform DNS queries. This replacement applies for all the APNs in the subscriber's profile. |
| Reserved Service Label Specific APN-OI Replacement | Indicates the domain name to replace the APN OI when constructing the PDN GW FQDN upon which to perform DNS queries. This replacement applies only for the APNs with reserved service label APNs or specific request types. |
| RFSP Index | An index to specific RRM configuration in the E-UTRAN |
| URRP-MME | UE Reachability Request Parameter indicating that UE activity notification from MME has been requested by the HSS. |
| Each subscription profile contains one or more PDN subscription contexts. | |
| Context Identifier | Index of the PDN subscription context. |
| PDN Address | Indicates subscribed IP address(es). |
| PDN Type | Indicates the subscribed PDN Type (IPv4, IPv6, IPv4v6) |
| Access Point Name (APN) | A label according to DNS naming conventions describing the access point to the packet data network (or a wildcard). |
| EPS subscribed QoS profile | The bearer level QoS parameter values for that APN's default bearer (QCI and ARP) (see clause 4.7.3). |
| Subscribed-APN-AMBR | The maximum aggregated uplink and downlink MBRs to be shared across all Non-GBR bearers, which are established for this APN. |
| EPS Bearer Context Charging Characteristics | The charging characteristics of this EPS Bearer context for the MS, e.g. normal, prepaid, flat-rate, and/or hot billing subscription. The charging characteristics is associated with this APN. |
| VPLMN Address Allowed | Specifies whether for this APN the UE is allowed to use the PDN GW in the domain of the HPLMN only, or additionally the PDN GW in the domain of the VPLMN. |
| PDN GW identity | The identity of the PDN GW used for this APN. The PDN GW identity may be either an FQDN or an IP address. The PDN GW identity refers to a specific PDN GW. |
| PDN GW Allocation Type | Indicates whether the PDN GW is statically allocated or dynamically selected by other nodes. A statically allocated PDN GW is not changed during PDN GW selection. |

Referring first to FIG. 9, a block diagram of a wireless communication unit (sometimes referred to as a user equipment (UE) in terms of a 3rd generation partnership project (3GPP) communication system) is shown, in accordance with a preferred embodiment of the invention.

The wireless communication unit 900 contains an antenna 902 preferably coupled to a duplex filter or antenna switch 904 that provides isolation between receive and transmit chains within the UE 900.

The receiver 925, as known in the art, includes receiver front-end circuitry 906 (effectively providing reception, filtering and intermediate or base-band frequency conversion). The front-end circuitry 906 is serially coupled to a signal processing module 908. An output from the signal processing module 908 is provided to a suitable output device 910, such as a screen or flat panel display. The receiver 925 also includes a controller 914 that maintains overall control of the wireless communication unit. The controller 914 is also coupled to the receiver front-end circuitry 906 and the signal processing module 908 (generally realised by a digital signal processor (DSP)). The controller 914 is also coupled to a memory device 916 that selectively stores operating regimes, such as decoding/encoding functions, synchronisation patterns, code sequences, and the like.

In accordance with examples of the invention, the memory device 916 stores APN information, and specifically APN related to a remote private IP access request, for example in a form of a service specific label or a service specific request type. Furthermore, a timer 918 is operably coupled to the controller 914 to control the timing of operations (transmission or reception of time-dependent signals) within the UE 900.

As regards the transmitter 930, this essentially includes an input device 920, such as a keypad, coupled in series through transmitter/modulation circuitry 922 and a power amplifier 924 to the antenna 902. The transmitter/modulation circuitry 922 and the power amplifier 924 are operationally responsive to the controller 914.

The signal processor module 908 in the transmit chain may be implemented as distinct from 25 the processor in the receive chain. Alternatively, a single processor 908 may be used to implement processing of both transmit and receive signals, as shown in FIG. 9. Clearly, the various components within the UE 900 can be realised in discrete or integrated component form, with an ultimate structure therefore being merely an application-specific or design selection.

In accordance with examples of the invention, the signal processing module 908 applies a specific APN to an activate PDP context message when a remote private IP access request is desired by the UE. The APN is obtained from memory device 916.

The transmitter chain is then configured by the controller 914 to transmit the activate PDP context message with the specific APN. In response to the activate PDP context message with the specific APN being sent to the network entity, the receiver receives an activate PDP context accept message with the IP address of the remote private IP network from the network entity.

In some examples, some or all of the steps illustrated in the message sequence chart of FIG. 5 or FIG. 7 may be implemented in hardware and/or some or all of the steps illustrated in the message sequence chart may be implemented in software.

Thus, the hereinbefore examples provide a wireless communication unit and a network entity (for example in a form of a GGSN-P-GW, and in some examples a SGSN or MME), that facilitate a remote private IP access to a UE's home IP network. Although some aspects of the invention have been described with reference to their applicability to a UMTS (Universal Mobile Telecommunication System) cellular communication system and in particular to a UMTS Terrestrial Radio Access Network (UTRAN) of a 3rd generation partnership project (3GPP) system, it will be appreciated that the invention is not limited to this particular cellular communication system. It is envisaged that the concept described above may be applied to any other cellular communication system that comprises network elements that support IP connectivity.

Referring now to FIG. 10, there is illustrated a typical computing system 1000 that may be employed to implement signal processing functionality in embodiments of the invention.

Computing systems of this type may be used in access points and wireless communication units. Those skilled in the relevant art will also recognize how to implement the invention using other computer systems or architectures. Computing system 1000 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1000 can include one or more processors, such as a processor 1004. Processor 1004 can be implemented using a general or special-purpose processing engine such as, for example, a microprocessor, microcontroller or other control module. In this example, processor 1004 is connected to a bus 1002 or other communications medium.

Computing system 1000 can also include a main memory 1008, such as random access memory (RAM) or other dynamic memory, for storing information and instructions to be executed by processor 1004. Main memory 1008 also may be used for storing temporary variables or other intermediate information during execution of instructions to be executed by processor 1004. Computing system 1000 may likewise include a read only memory (ROM) or other static storage device coupled to bus 1002 for storing static information and instructions for processor 1004.

The computing system 1000 may also include information storage system 1010, which may include, for example, a media drive 1012 and a removable storage interface 1020. The media drive 1012 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 818 may include, for example, a hard disk, floppy disk, magnetic tape, optical disk, CD or DVD, or other fixed or removable medium that is read by and written to by media drive 1012. As these examples illustrate, the storage media 1018 may include a computer readable storage medium having particular computer software or data stored therein.

In alternative embodiments, information storage system 1010 may include other similar components for allowing computer programs or other instructions or data to be loaded into computing system 1000. Such components may include, for example, a removable storage unit 1022 and an interface 1020, such as a program cartridge and cartridge interface, a removable memory (for example, a flash memory or other removable memory module) and memory slot, and other removable storage units 1022 and interfaces 1020 that allow software and data to be transferred from the removable storage unit 1018 to computing system 1000.

Computing system 1000 can also include a communications interface 1024. Communications interface 1024 can be used to allow software and data to be transferred between computing system 1000 and external devices. Examples of communications interface 1024 can include a modem, a network interface (such as an Ethernet or other NIC card), a communications port (such as for example, a universal serial bus (USB) port), a PCMCIA slot and card, etc. Software and data transferred via communications interface 1024 are in the form of signals which can be electronic, electromagnetic, and optical or other signals capable of being received by communications interface 1024. These signals are provided to communications interface 1024 via a channel 1028. This channel 1028 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 1008, storage device 1018, or storage unit 1022. These and other forms of computer-readable media may store one or more instructions for use by processor 1004, to cause the processor to perform specified operations. Such instructions, generally referred to as 'computer program code' (which may be grouped in the form of computer programs or other groupings), when executed, enable the computing system 1000 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1000 using, for example, removable storage drive 1022, drive 1012 or communications interface 1024. The control module (in this example, software instructions or computer program code), when executed by the processor 1004, causes the processor 1004 to perform the functions of the invention as described herein.

In particular, it is envisaged that the aforementioned inventive concept can be applied by a semiconductor manufacturer to any integrated circuit comprising a signal processing module that is adapted to generate the specific (remote access) APN within the UE. Furthermore, the aforementioned inventive concept can be applied by a semiconductor manufacturer to any integrated circuit comprising a signal processing module that is adapted to determine the specific (remote access) APN sent from the UE and, in response thereto, replace the APN-OI so that it relates to the UE's home NB. It is further envisaged that, for example, a semiconductor manufacturer may employ the inventive concept in a design of a stand-alone device, or application specific integrated circuit (ASIC) and/or any other subsystem element.

It will be appreciated that, for clarity purposes, the above description has described embodiments of the invention with reference to different functional units and processors. However, it will be apparent that any suitable distribution of functionality between different functional units or processors, for example with respect to the beamforming module or beam scanning module, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved network entity, wireless communication unit, integrated circuits and a method for managed access to remote private IP network have been described, wherein the aforementioned disadvantages with prior art arrangements have been substantially alleviated.

The invention claimed is:

1. A method by a core network entity, the method comprising:
   receiving, by the core network entity, an access request message from a user equipment through a remote network, the access request message comprising an identifier and first operator information related to a public land mobile network (PLMN) of the remote network;
   determining, by the core network entity, from the identifier that the access request message indicates a remote access request to a remote private internet protocol (IP) network of the user equipment;
   replacing, by the core network entity, the first operator information included in the access request message with second operator information related to a PLMN of the remote private IP network; and
   transmitting, by the core network entity, an access acceptance message including the second APN to the user equipment,
   wherein the second operator information is obtained by the core network entity from a home subscriber server (HSS) based on subscriber profile information of the user equipment.

2. The method of claim 1 wherein the identifier in the access request message comprises a remote private access allocated access point name (APN).

3. The method of claim 1 wherein the remote private IP network is accessed from the user equipment through a serving base station.

4. The method of claim 1 wherein the access acceptance message comprises an IP address within a range of addresses allocated to the remote private IP network accessed by the user equipment.

5. The method of claim 1 further comprising informing the home network element of the access request message.

6. The method of claim 5 wherein informing the home network element of the access request message comprises replacing at least one information element within the access request message with an identifier of the remote private IP network of the user equipment.

7. The method of claim 6 wherein replacing at least one information element within the request comprises replacing a first identifier identifying operator information of a network that is serving the user equipment with a second identifier identifying operator information of the remote private IP network accessed by the user equipment.

8. The method of claim 7 further comprising replacing the at least one information element with the second identifier using an address provided by an internal domain name server (DNS) operably coupled to a gateway general packet radio service support node (GGSN) without needing to resolve the access request through a public Internet DNS operation.

9. The method of claim 6 wherein the core network entity is a serving general packet radio service support node (SGSN) or mobility management entity (MME) located in a visiting public land mobile network (VPLMN) that is serving the user equipment and the core network entity is arranged to select a packet gateway (PGW) IP address of the VPLMN to replace the at least one information element.

10. The method of claim 9 further comprising:
forwarding the access request from the MME or SGSN following resolving of the identifier to a GGSN or P-GW that is located in the home public land mobile network (PLMN) of the user equipment.

11. The method of claim 9 wherein the replacing at least one information element within the access request message with an identifier of the remote private IP network of the user equipment is performed in one of the following:
(i) where both the user equipment and a serving base station of the private IP network are located in the same HPLMN;
(ii) where both the user equipment the serving base station of the private IP network are supported by the same HPLMN, and the UE is roaming to a VPLMN that has a roaming agreement with the HPLMN;
(iii) where both the user equipment the serving base station of the private IP network are supported by different HPLMNs and a roaming agreement exists between the two different PLMNs; and
(iv) where both the user equipment the serving base station of the private IP network are supported by different HPLMNs are supported by different HPLMNs, and no roaming agreement exists between the different PLMNs.

12. The method of claim 6 wherein the core network entity is a serving general packet radio service support node (SGSN) or mobility management entity (MME) located in a home public land mobile network (HPLMN) of the user equipment wherein the replacing comprises accessing a home subscriber server (HSS) of the user equipment, operably coupled to the core network entity, and extracting therefrom the identifier of the remote private IP network to be used in replacing the at least one information element.

13. The method of claim 12 further comprising:
identifying an IP address of a home network entity transport IP gateway or home gateway connected to the home PLMN of the wireless communication by resolving a fully qualified domain name (FQDN) of a service specific identifier, combined with the network operator information.

14. The method of claim 1 wherein the identifier is dedicated as one from a group of:
a service specific label in the identifier, a service specific request-type identifier.

15. A core network entity comprising:
a receiver configured to receive an access request message from a user equipment through a remote network, wherein the access request message comprises an identifier and first operator information related to a public land mobile network (PLMN) of the remote network;
a signal processor configured to:
determine from the identifier that the access request message indicates a remote access request to a remote private internet protocol (IP) network of the user equipment, and
replace the first operator information included in the access request message with second operator information related to a PLMN of the remote private IP network; and
a transmitter configured to transmit an access acceptance message including the second APN to a wireless transceiver,
wherein the second operator information is obtained by the core network entity from a home subscriber server (HSS) based on subscriber profile information of the user equipment.

16. A method by a user equipment, the method comprising:
generating an access request message for remotely accessing a remote private internet protocol (IP) network, the access request message comprising an identifier indicating a remote access request to the remote private IP network and first operator information related to a public land mobile network (PLMN) of a remote network;
transmitting the generated access request message to a core network entity through the remote network;
receiving an access acceptance message including second operator information related to a PLMN of the remote private IP network and an IP address of the remote private IP network of the user equipment from the core network entity; and
communicating with the remote private IP network of the user equipment using the IP address provided based on the identifier,
wherein the second operator information is obtained from a home subscriber server (HSS) based on subscriber profile information of the user equipment, and
wherein the first operator information included in the access request message is replaced by the core network entity with the second operator information of the remote private IP network.

17. A user equipment comprising:
a signal processor configured to generate an access request message for accessing a remote private internet protocol (IP) network, the access request message comprising an identifier indicating a remote access request to the remote private IP network and first operator information related to a public land mobile network (PLMN) of a remote network;
a transmitter configured to transmit the request to a core network entity through the remote network; and
a receiver configured to receive an access acceptance message, the access acceptance message comprising an IP address of the remote private IP network of the user equipment and second operator information related to a PLMN of the remote private IP network,
wherein the second operator information is obtained from a home subscriber server (HSS) based on subscriber profile information of the user equipment, and
wherein the first operator information included in the access request message is replaced by the core network entity with the second operator information of the remote private IP network.

* * * * *